US012579379B2

(12) United States Patent
Yoo et al.

(10) Patent No.: US 12,579,379 B2
(45) Date of Patent: Mar. 17, 2026

(54) CUSTOMIZED PERSONALITY AGENT SYSTEM EVOLVING ACCORDING TO USER SATISFACTION

(71) Applicant: Korea Electronics Technology Institute, Seongnam-si (KR)

(72) Inventors: Jae Woong Yoo, Seongnam-si (KR); Hye Dong Jung, Seoul (KR); Mi Ra Lee, Hwaseong-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 119 days.

(21) Appl. No.: 18/536,853

(22) Filed: Dec. 12, 2023

(65) Prior Publication Data

US 2024/0193376 A1     Jun. 13, 2024

(30) Foreign Application Priority Data

Dec. 13, 2022     (KR) ........................ 10-2022-0173469
Mar. 21, 2023     (KR) ........................ 10-2023-0036763

(51) Int. Cl.
*G06F 40/40*          (2020.01)
*H04L 67/1396*      (2022.01)

(52) U.S. Cl.
CPC .......... *G06F 40/40* (2020.01); *H04L 67/1396* (2022.05)

(58) Field of Classification Search
CPC ........ G06F 40/40; G06F 40/35; G06F 40/284; G06F 16/9535; G06F 16/9538;
(Continued)

(56) References Cited

U.S. PATENT DOCUMENTS

| | | | | | |
|---|---|---|---|---|---|
| 2014/0359439 | A1* | 12/2014 | Lyren | .................. | G06F 16/9538 |
| | | | | | 707/706 |
| 2018/0121784 | A1* | 5/2018 | Ichiboshi | ............... | G16H 10/20 |
| 2021/0064827 | A1* | 3/2021 | Galitsky | ............... | G06N 20/00 |

FOREIGN PATENT DOCUMENTS

| | | |
|---|---|---|
| JP | 7003400 B2 | 1/2022 |
| KR | 10-2020-0031245 A | 3/2020 |

(Continued)

OTHER PUBLICATIONS

Korean Office Action Issued on May 7, 2024, in Counterpart Korean Patent Application No. 10-2023-0036763 (8 Pages in English, 10 Pages in Korean).

(Continued)

*Primary Examiner* — Yogeshkumar Patel
(74) *Attorney, Agent, or Firm* — NSIP Law

(57)     ABSTRACT

There is provided a customized personality agent system evolving according to a satisfaction of a user. An interactive service providing method according to an embodiment provides an interactive AI service to a user by using an agent that is selected from a plurality of agents based on a state of personality of the user, and evaluates a satisfaction of the user and trains the agent that provides the interactive service. Accordingly, by searching an agent that has an optimal personality suited to a state of personality of a user and providing an interactive AI service, service quality may be enhanced. Also, by rewarding and training an agent that provides a service based on a satisfaction of a user who receives the service, the personality of the agent may evolve to be well suited to a personality of the user.

19 Claims, 2 Drawing Sheets

(58) Field of Classification Search
CPC ... G06F 16/337; H04L 67/1396; G10L 15/22;
G10L 15/04; G10L 15/14; G10L 25/63;
G10L 15/063; G10L 2015/0638; G06N
3/006; G06N 5/04; A61B 5/165
See application file for complete search history.

(56) References Cited

FOREIGN PATENT DOCUMENTS

| | | | | | |
|---|---|---|---|---|---|
| KR | 20200031245 A | * | 3/2020 | ........... | G10L 15/063 |
| KR | 10-2021-0123545 A | | 10/2021 | | |
| KR | 20210123545 A | * | 10/2021 | ............. | G06Q 50/20 |

OTHER PUBLICATIONS

Office Action issued on Nov. 10, 2023, in counterpart Korean patent application No. 10-2023-0036763. (7 Pages English) (8 Pages Korean).

* cited by examiner

CUSTOMIZED PERSONALITY AGENT SYSTEM EVOLVING ACCORDING TO USER SATISFACTION

CROSS-REFERENCE TO RELATED APPLICATION(S) AND CLAIM OF PRIORITY

This application is based on and claims priority under 35 U.S.C. § 119 to Korean Patent Application No. 10-2022-0173469, filed on Dec. 13, 2022, and Korean Patent Application No. 10-2023-0036763, filed on Mar. 21, 2023, in the Korean Intellectual Property Office, the disclosure of which is herein incorporated by reference in its entirety.

BACKGROUND

Field

The disclosure relates to an interactive artificial intelligence (AI) service, and more particularly, to a customized AI service agent system which is selected according to a personality of a user and evolves according to user satisfaction.

Description of Related Art

As various technologies are developing in recent years, more various types of interaction are possible between a human and a computer. However, the majority of agent systems merely report a result in response to a simple input of a user like a wearable device communicating a biometric signal in close contact with user's body, or an interactive speaker.

In addition, customized systems reflecting users' tendencies have been suggested, but there has been no attempt to provide agents reflecting users' characteristic such as personalities. However, since a human personality is an essential element to understand and predict a user, there is a need for a specific approach for an AI service using a human personality.

SUMMARY

The disclosure has been developed in order to solve the above-described problems, and an object of the disclosure is to provide an interactive AI agent system which provides a user-customized agent having a personality suited to a user's personality, and evolves the agent through user's satisfaction.

According to an embodiment of the disclosure to achieve the above-described object, a method for providing an interactive service may include: a step of, when there is a request for an interactive service from a user, searching and selecting one of a plurality of agents based on a recent state of personality of the user; and a step of providing an interactive AI service to the user by using the selected agent, and the agents may have different personalities and may have action policies according to personalities.

The step of selecting may include: referring to a state of personality of the user recognized when a previous interactive service is provided as the recent state of personality of the user; and, for a user who is not provided with a previous interactive service, referring to a state of personality recognized through a survey for the user as the recent state of personality of the user.

The step of selecting may include selecting an agent that has a state of personality having a difference from the state of personality of the user by a defined value.

According to an embodiment of the disclosure, the interactive service providing method may further include: a step of evaluating a satisfaction of the user when the interactive service is finished; and a step of training the agent that provides the interactive service based on a result of evaluating the satisfaction.

The step of evaluating may include evaluating the satisfaction of the suer based on a user survey or a state of response of the user recognized while the interactive service is being provided.

The step of training may include giving a positive reward value to the agent when the evaluated satisfaction is greater than a satisfaction at a previous time, and giving a negative reward value to the agent when the evaluated satisfaction is not greater than a satisfaction at a previous time, so that the action policy of the agent evolves to increase a satisfaction.

The action policy of the agent may be defined as a conditional probability that the agent does a specific action in a current state of the user. The current state of the user may include a state of personality and a state of response of the user.

According to an embodiment of the disclosure, the interactive service providing method may further include a step of expressing the state of personality and the state of response of the user in real time.

According to another embodiment of the disclosure, an interactive agent system may include: a selection unit configured to, when there is a request for an interactive service from a user, search and select one of a plurality of agents based on a recent state of personality of the user; and agents configured to provide an interactive AI service to the user when one of the agents is selected by the selection unit, and the agents may have different personalities and may have action policies according to personalities.

According to still another embodiment of the disclosure, a method for providing an interactive service may include: a step of providing an interactive AI service to a user by using an agent that is selected from a plurality of agents based on a state of personality of the user; a step of evaluating a satisfaction of the user when the interactive service is finished; and a step of training the agent that provides the interactive service based on a result of evaluating the satisfaction.

According to yet another embodiment of the disclosure, a computer-readable recording medium has a program recorded thereon to perform a method for providing an interactive service, the method including: a step of providing an interactive AI service to a user by using an agent that is selected from a plurality of agents based on a state of personality of the user; a step of evaluating a satisfaction of the user when the interactive service is finished; and a step of training the agent that provides the interactive service based on a result of evaluating the satisfaction.

According to embodiments of the disclosure as described above, by searching an agent that has an optimal personality suited to a recent state of personality of a user which is identified from multimodal data of the user in real time, and providing an interactive AI service, service quality may be enhanced.

In addition, according to embodiments of the disclosure, by rewarding and training an agent that provides a service based on a satisfaction of a user who receives the service, the personality of the agent may evolve to be well suited to a personality of the user.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Embodiments of the disclosure provide an interactive AI service providing method reflecting user's personality and satisfaction. Specifically, embodiments of the disclosure provide a technology for providing a user-customized agent having a personality well suited to a user's personality, which is identified from multimodal data of the user, and evolving the agent through user's satisfaction.

Considering that a user's personality changes in real time, a customized service suited to a user's personality may be provided by an interactive AI agent system capable of responding to real-time change in personality, and an action policy of an agent may be evolved by reinforcing and training the agent based on real-time satisfaction of the user.

Figure 1:
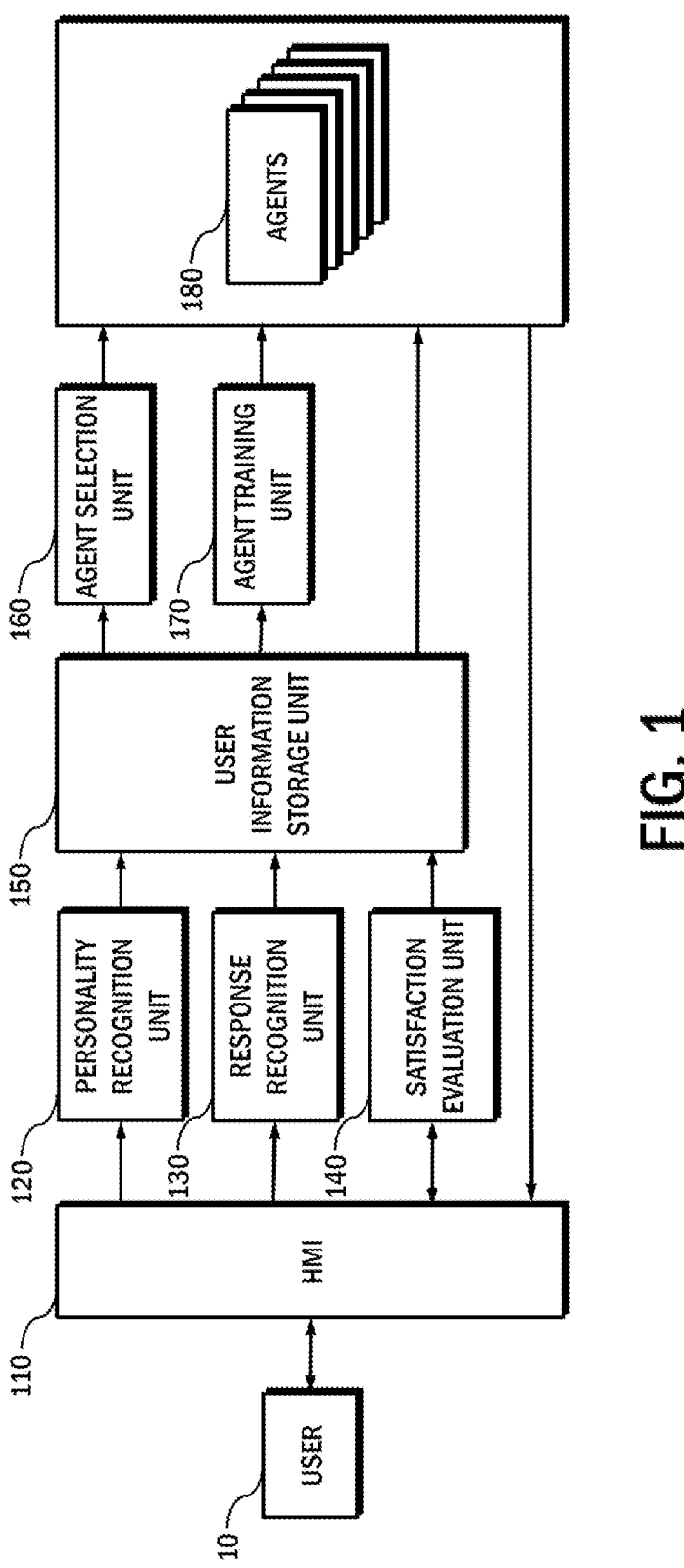
FIG. 1 is a configuration diagram of an interactive agent system according to an embodiment of the disclosure.

FIG. 1 is a view illustrating a configuration of an interactive agent system according to an embodiment of the disclosure. As shown in FIG. 1, the interactive agent system according to an embodiment may include a human machine interface (HMI) 110, a personality recognition unit 120, a response recognition unit 130, a satisfaction evaluation unit 140, a user information storage unit 150, an agent selection unit 160, an agent training unit 170, and agents 180.

The HMI 110 may include sensors (for example, an image sensor, a microphone, etc.) for collecting multimodal data from a user 10, and an output means (for example, a display, a speaker, etc.) for providing an interactive AI service to the user 10.

The personality recognition unit 120 may recognize a state of personality of the user 10 from multimodal data of the user 10 collected through the HMI 110, and may store the recognized state of personality of the user 10 in the user information storage unit 150 in real time. The personality recognition unit 120 may be implemented by using an AI model that is trained to parse multimodal data and to predict a state of personality of the user 10.

The multimodal data may further include utterance data and caption data in addition to video data and audio data. The utterance data may be text data that is generated by converting an uttered voice of the user 10 through speech-to-text (STT) conversion, and the caption data may be text data that represents a facial expression of the user 10, an ambient object, a situation, etc. which are derived through video captioning.

The state of personality may be indicated by using an OCEAN index (big five factor). Herein, O is an index representing openness to experience, C is an index representing conscientiousness, E is an index representing extraversion, A is an index representing agreeableness, and N is an index representing neuroticism.

According to the OCEAN index, the personality recognition unit 120 may recognize O, C, E, A, N indexes from the multimodal data of the user 10.

The response recognition unit 130 may recognize a state of response (utterance, facial expression, gesture, etc.) of the user 10 from the multimodal data of the user 10 which is collected through the HMI 110, and may store the recognized state of response of the user 10 in the user information storage unit 150 in real time. The response recognition unit 130 may be implemented by using an AI model that is trained to parse multimodal data and to predict a state of response of the user 10.

The agents 180 are AI models for providing an interactive AI service to the user 10. The agents 180 may have different states of personality and have different action policies according to states of personality. Since a service provided in embodiments of the disclosure is an interactive service, an action of the agent 180 may be regarded as utterance (conversation).

An action policy ($\pi$) of the agents 180 may be expressed by the following equation:

$$\pi(a|s)=P[A_t=a|S_t=s]$$

Herein, the action policy ($\pi$) refers to a conditional probability that the agent 180 does an action $A_t$ in a whole state $S_t$ of the user 10 at a time t. The whole state $S_t$ of the user 10 may be expressed by the following equation:

$$S_t=S_{up}+S_{ur}$$

Herein, $S_{up}$ is a state of user personality of the user 10, that is, an OCEAN index, and $S_{ur}$ is a state of user response of the user 10, that is, utterance, facial expression, gesture, etc.

The agent selection unit 160 selects an agent 180 to provide an interactive AI service to the user 10, based on a recent state of personality of the user 10 which is stored in the user information storage unit 150.

The agent 180 selected by the agent selection unit 160 determines an action according to the action policy, based on the state of personality and the state of response of the user 10 which are stored in the user information storage unit 150 in real time. The action (utterance) determined by the agent 180 may be expressed through the HMI 110 and may be provided to the user 10.

The satisfaction evaluation unit 140 evaluates satisfaction of the user 10 regarding the interactive AI service, and stores a result of evaluating in the user information storage unit 150.

The agent training unit 170 may retrain the agent 180 which provides the interactive AI service, based on the result of evaluating satisfaction which is stored in the user information storage unit 150.

Figure 2:
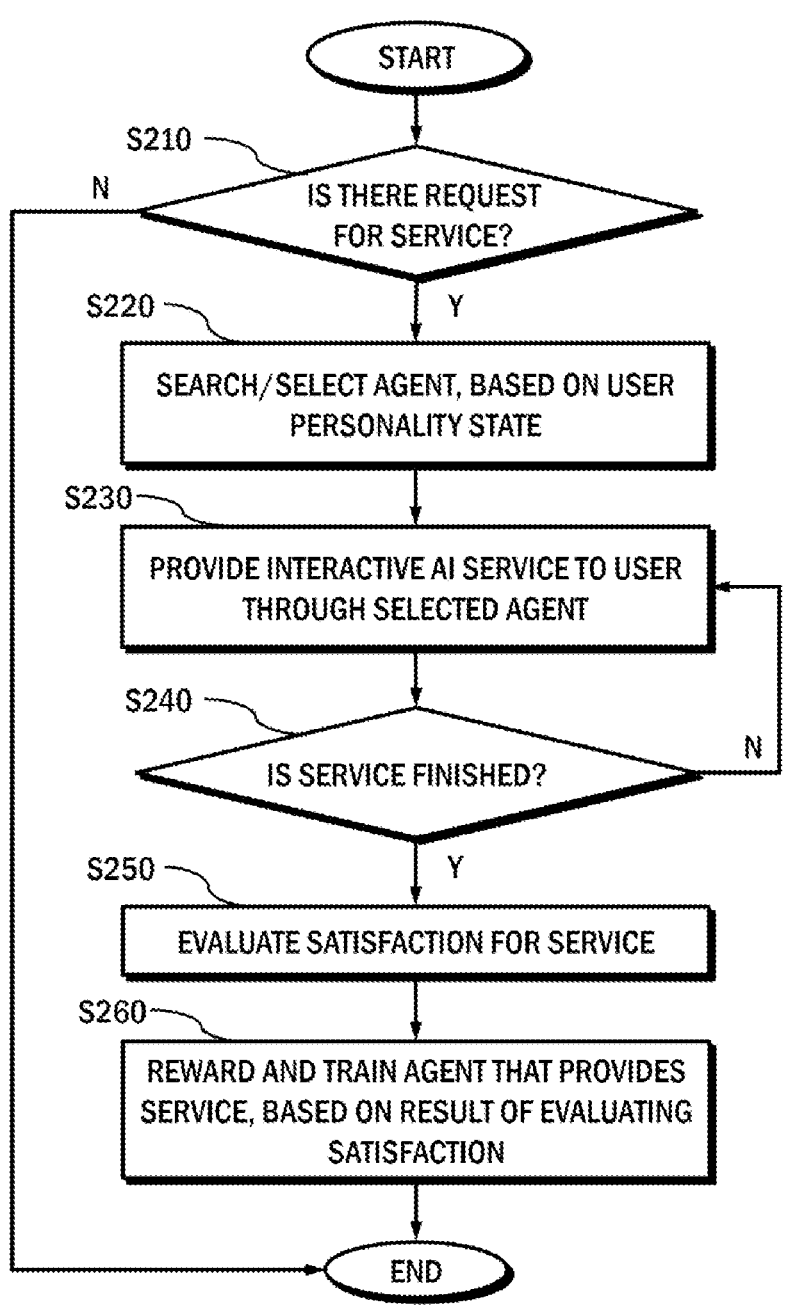
FIG. 2 is a flowchart provided to explain an interactive AI service method according to another embodiment of the disclosure.

A process of providing a service by the illustrated system will be described in detail below with reference to FIG. 2. FIG. 2 is a flowchart provided to explain an interactive AI service method according to another embodiment.

When there is a request for an interactive AI service from the user 10 (S210-Y), the agent selection unit 160 searches and selects an agent 180 that well matches a recent state of personality of the user 10 (S220).

Since a state of personality of the user 10 is recognized by the personality recognition unit 120 and is stored in the user information storage unit 150 in real time, the agent selection unit 160 may identify a recent state of personality of the user 10 which changes in real time with reference to the user information storage unit 150.

When the user 10 uses the interactive AI service for the first time, there is no state of personality of the user 10 recognized by the personality recognition unit 120. In this case, an initial state of personality of the user 10 stored in the user information storage unit 150 may be utilized. The initial state of personality is a state of personality that is recognized through a survey for the user 10.

The agent 180 searched at step S220 is an agent 180 that has a state of personality best suited to the state of personality of the user 10. Rather than an agent that has the same personality as the personality of the user 10, an agent 180 that has a personality difference $(d_p(t)=|S_{up}-S_{ap}|_t)$ closest to a defined value, that is, has an appropriate personality difference, is the agent 180 that has the personality best suited to the personality of the user 10. Herein, $S_{up}$ is a state of personality of the user 10 and $S_{ap}$ is a state of personality of the agent 180.

Thereafter, the agent 180 selected at step S220 may provide an interactive AI service to the user 10 through the HMI 110 (S230). The interactive AI service provided at step S230 follows an action (utterance) policy of the selected agent 180.

While the interactive AI service is being provided through step S230, the personality recognition unit 120 may recognize a state of personality of the user 10 in real time from multimodal data of the user 10 collected through the HMI 110, and the response recognition unit 130 may recognize a state of response of the suer 10 in real time and may store recognized state information in the user information storage unit 150 in real time.

When the interactive AI service is finished (S240-Y), the satisfaction evaluation unit 140 evaluates satisfaction of the user 10 regarding the interactive AI service through a survey (S250). Satisfaction may be evaluated by summing up 5-point Likert scale scores with respect to the following three items:

A) What do you think about the service provided by the agent?

B) How satisfied are you with the service provided by the agent?

C) Are you willing to have a conversation with the agent next time?

The agent training unit 170 rewards and trains the agent 180 to increase satisfaction evaluated through step S250 (S260).

Specifically, when the evaluated satisfaction is greater than satisfaction at a previous time, the agent training unit 170 gives a positive reward value to the agent 180, and, when the evaluated satisfaction is not greater than satisfaction at a previous time, the agent training unit 170 gives a negative reward value to the agent 180, so that the action policy of the agent evolves to increase satisfaction.

Accordingly, the agent 180 that is selected at step S220 and provides the interactive AI service through step S230 has probability values of its action policy updated by the agent training unit 170.

Up to now, an interactive AI service method and an agent system therefor have been described with reference to preferred embodiments.

In the above-described embodiments, satisfaction regarding the agent 180 is evaluated through a survey. However, this is merely an example and changes may be made thereto. For example, satisfaction may be evaluated in real time based on a state of response of the user 10 which is recognized by the response recognition unit 130 while a service is being provided through the agent 180.

In addition, the items suggested in the above-described embodiments are merely examples and may be replaced with items of different contents. For example, evaluation items such as intimacy (unkind-kind, disagreeable-favorable, mean-generous, selfish-selfless), personification (fake-natural, machine-like-human-like, unconscious-conscious), vividness (dead-alive, sluggish-lively, impassive-responsive) are possible.

Furthermore, it is possible to add a service to provide a state of personality and a state of response of the user 10 which are recognized in real time to the user 10 through the HMI 10 in real time.

The field of human-computer interaction is growing to perform an important role in making user-friendly systems. There is a need for an interactive agent system that evolves a corresponding agent entity through continuous interaction between a user and the agent and retraining of the corresponding agent, and provides a service suited to a tendency (personality, characteristic) of the user.

In embodiments of the disclosure, by evolving an agent that is generated by continuously training a conversation object (agent) according to user's tendency as one independent entity, a service optimized to user's tendency or requirement may be provided, and simultaneously, convenience may be provided to a user like a private secretary of a user.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded medium may be any data storage device that can be ready by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A processor-implemented method for providing an interactive service using a neural network-based interactive agent system, the method comprising:

determining a real-time response state of a user based on continuous multi-model sensing data including at least one of gaze, voice, and gesture information associated with the user;

when there is a request for an interactive service from a user, selecting one of a plurality of agents based on a recent state of personality of the user and the real-time response state of the user, each of the plurality of agents being a trained artificial intelligence (AI) model using training data with respectively different personalities of different users; and providing an interactive service to the user by using the selected agent, wherein the agents have the respectively different personalities and have action policies according to the respectively different personalities.

2. The method of claim 1, wherein the selecting comprises:

referring to a state of personality of the user recognized when a previous interactive service is provided as the recent state of personality of the user; and for a user who is not provided with a previous interactive service, referring to a state of personality recognized through an initial personality survey for the user as the recent state of personality of the user.

3. The method of claim 1, wherein the step of selecting comprises selecting an agent that has a state of personality having a difference from the state of personality of the user by a pre-defined value.

4. The method of claim 1, further comprising:

evaluating a satisfaction of the user when the interactive service is finished; and re-training the agent that provides the interactive service based on a result of evaluating the satisfaction.

5. The method of claim 4, wherein the evaluating comprises evaluating the satisfaction of the user based on the survey or a state of response of the user recognized while the interactive service is being provided.

6. The method of claim 4, wherein the re-training comprises giving a positive reward value to the agent when the evaluated satisfaction is greater than a satisfaction determined at a previous time, and giving a negative reward value to the agent when the evaluated satisfaction is not greater than the satisfaction determined at the previous time, so that an action policy of the agent evolves to increase a satisfaction determined at a next time.

7. The method of claim 1, wherein an action policy of the agent is defined as a conditional probability that the agent does a specific action in a current state of the user.

8. The method of claim 7, wherein the current state of the user includes a state of personality and a state of response of the user.

9. The method of claim 8, further comprising expressing the state of personality and the state of response of the user in real time.

10. An interactive agent system comprising:

one or more processors comprising:

a selection unit configured to:

determine a real-time response state of a user based on continuous multi-model sensing data including at least one of gaze, voice, and gesture information associated with the user;

when there is a request for an interactive service from a user, search and select one of a plurality of agents based on a recent state of personality of the user and the real-time response state of the user, each of the plurality of agents being a trained artificial intelligence (AI) model using training data with respectively different personalities of different users; and the selected agent, from among the plurality of agents, configured to provide an interactive service to the user when one of the agents is selected by the selection unit, wherein the agents have the respectively different personalities and have action policies according to the respectively different personalities.

11. A method for providing an interactive service, the method comprising:

determining a real-time response state of a user based on continuous multi-model sensing data including at least one of gaze, voice, and gesture information associated with the user;

providing an interactive service to the user by using an agent that is selected from a plurality of agents based on a state of personality of the user and the real-time response state of the user;

evaluating a satisfaction of the user when the interactive service is finished; and training the agent that provides the interactive service based on a result of evaluating the satisfaction.

12. The system of claim 10, wherein, for the selecting, the one or more processors are configured to:

refer to a state of personality of the user recognized when a previous interactive service is provided as the recent state of personality of the user; and for a user who is not provided with a previous interactive service, refer to a state of personality recognized through a survey for the user as the recent state of personality of the user.

13. The system of claim 10, wherein, for the selecting, the one or more processors are configured to select an agent that has a state of personality having a difference from the state of personality of the user by a defined value.

14. The system of claim 10, wherein the one or more processors are configured to:

evaluate a satisfaction of the user when the interactive service is finished; and re-train the agent that provides the interactive service based on a result of evaluating the satisfaction.

15. The system of claim 14, wherein, for the evaluating, the one or more processors are configured to evaluate the satisfaction of the user based on the user survey or a state of response of the user recognized while the interactive service is being provided.

16. The system of claim 14, wherein, for the re-training, the one or more processors are configured to give a positive reward value to the agent when the evaluated satisfaction is greater than a satisfaction determined at a previous time, and give a negative reward value to the agent when the evaluated satisfaction is not greater than the satisfaction determined at the previous time, so that an action policy of the agent evolves to increase a satisfaction determined at a next time.

17. The system of claim 10,
wherein an action policy of the agent is defined as a conditional probability that the agent does a specific action in a current state of the user.

18. The system of claim 17, wherein the current state of the user includes a state of personality and a state of response of the user.

19. The system of claim 18, wherein the one or more processors are configured to express the state of personality and the state of response of the user in real time.

* * * * *